(12) United States Patent
Paudel et al.

(10) Patent No.: US 12,139,136 B2
(45) Date of Patent: Nov. 12, 2024

(54) VEHICLE UNCERTAINTY SHARING

(71) Applicant: Ford Global Technologies, LLC, Dearborn, MI (US)

(72) Inventors: Shreyasha Paudel, Sunnyvale, CA (US); Marcos Paul Gerardo Castro, Mountain View, CA (US); Sandhya Bhaskar, Dearborn, MI (US); Clifton K. Thomas, Palo Alto, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 853 days.

(21) Appl. No.: 16/829,207

(22) Filed: Mar. 25, 2020

(65) Prior Publication Data

US 2021/0300356 A1 Sep. 30, 2021

(51) Int. Cl.
*B60W 30/00* (2006.01)
*B60W 30/095* (2012.01)
(Continued)

(52) U.S. Cl.
CPC ......... *B60W 30/0956* (2013.01); *G01C 21/32* (2013.01); *G01C 21/3461* (2013.01);
(Continued)

(58) Field of Classification Search
CPC ..... B60W 30/0956; B60W 2554/4029; B60W 2554/4042; B60W 2554/4044;
(Continued)

(56) References Cited

U.S. PATENT DOCUMENTS 8,169,338 B2  5/2012  Mudalige
2018/0188045 A1* 7/2018 Wheeler ................ G01C 21/32
(Continued)

FOREIGN PATENT DOCUMENTS

DE       10120235 B4   9/2004
WO    2019074478 A1   4/2019

OTHER PUBLICATIONS

Corina Gurau, et. al., "Learn From Experience: Probabilistic Prediction of Perception Performance to Avoid Failure" (abstract only), The International Journal of Robotics Research, Oct. 8, 2017, retrieved from Internet URL: https://journals.sagepub.com/doi/pdf/10.1177/0278364917730603 (1 page).

*Primary Examiner* — Elaine Gort
*Assistant Examiner* — Brittany Renee Peko
(74) *Attorney, Agent, or Firm* — Frank A. MacKenzie; Bejin Bieneman PLC (57) ABSTRACT

A computer, including a processor and a memory, the memory including instructions to be executed by the processor to, based on sensor data in a vehicle, determine a database that includes object data for a plurality of objects, including, for each object, an object identification, a measurement of one or more object attributes, and an uncertainty specifying a probability of correct object identification, for the object identification and the object attributes determined based on the sensor data, wherein the object attributes include an object size, an object shape and an object location. The instructions include further instructions to determine a map based on the database including the respective locations and corresponding uncertainties for the vehicle type and download the map to a vehicle based on the vehicle location and the vehicle type.

20 Claims, 5 Drawing Sheets

(51) Int. Cl.
*G01C 21/32* (2006.01)
*G01C 21/34* (2006.01)
*G05B 13/02* (2006.01)
*G06N 3/04* (2023.01)
*G06N 3/08* (2023.01)

(52) U.S. Cl.
CPC ............ *G05B 13/027* (2013.01); *G06N 3/04*
(2013.01); *G06N 3/08* (2013.01); *B60W*
*2420/403* (2013.01); *B60W 2420/408*
(2024.01); *B60W 2420/54* (2013.01); *B60W*
*2554/4029* (2020.02); *B60W 2554/4042*
(2020.02); *B60W 2554/4043* (2020.02); *B60W*
*2554/4044* (2020.02); *B60W 2555/20*
(2020.02)

(58) Field of Classification Search
CPC ..... B60W 2555/20; B60W 2554/4043; B60W
2420/42; B60W 2420/52; B60W 2420/54;
G01C 21/32; G01C 21/3461; G05B
13/027; G06N 3/04; G06N 3/08
See application file for complete search history.

(56) References Cited

U.S. PATENT DOCUMENTS

| | | | |
|---|---|---|---|
| 2019/0220003 A1* | 7/2019 | Sharma | G05D 1/0044 |
| 2019/0242711 A1 | 8/2019 | Ingersoll et al. | |
| 2020/0183394 A1* | 6/2020 | Lockwood | G05D 1/0088 |
| 2021/0004363 A1* | 1/2021 | Bailly | G06F 16/235 |
| 2021/0063200 A1* | 3/2021 | Kroepfl | G01C 21/3841 |
| 2021/0123764 A1* | 4/2021 | McGill | G01C 21/3614 |
| 2021/0341308 A1* | 11/2021 | Ivanov | G01C 21/3859 |

\* cited by examiner

VEHICLE UNCERTAINTY SHARING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computing device in a vehicle can be programmed to acquire sensor data regarding the external environment of a vehicle and communicate the sensor data to a server computer. The server computer can maintain a database that includes data regarding objects identified and located using the sensor data along with data regarding the accuracy of the identification and location data. The server computer can map the accuracy data based on the real-world location of the identified objects to form hotspots and download the hotspot map data to vehicles as they operate. The server computer can sort the hotspot map data based on the type of vehicle that acquired the sensor data and the environmental conditions in which it was acquired to ensure that the accuracy data is pertinent to the vehicle that receives the downloaded hotspot map data.

Disclosed herein is method including, based on sensor data in a vehicle, determining a database that includes object data for a plurality of objects, including, for each object, a respective location, an object identification, a measurement of a physical attribute of the object, and an uncertainty specifying a probability of correct object identification, for a type of the vehicle, for the object identification and the physical attribute determined based on the sensor data, wherein the physical attribute includes an object location. A map can be determined based on the database including the respective locations and corresponding uncertainties for the vehicle type and the map can be downloaded to a vehicle based on a vehicle location and the vehicle type. A computer in the vehicle can include a vehicle computer processor and a vehicle computer memory including instructions executable by the vehicle computer processor to operate the vehicle based on the downloaded map. The object can include one or more of a vehicle and a pedestrian. The vehicle sensor data can include one or more of vehicle video sensor data, vehicle lidar sensor data, vehicle radar sensor data, and vehicle ultrasound sensor data. The vehicle type can include one or more of a vehicle make and a vehicle model.

The uncertainties can be determined by combining uncertainties for one or more objects with a same location and reported by a plurality of second vehicles of the same vehicle type. The database can be determined by combining the uncertainty with environmental conditions including one or more of time of day, season, and weather conditions. The object data can include a velocity of the object, wherein velocity includes object speed and object direction. The object data can be determined by processing vehicle sensor data with a deep neural network to determine the object physical attribute, the object identity and the uncertainty. The map can be input to the deep neural network to determine the object identity, the object physical attribute and the uncertainty. The deep neural network can be trained based on the map. The map can include one or more hotspots, wherein each hotspot includes a real-world location and the uncertainty corresponding to the real-world location. The one or more hotspots can include a vehicle make and model. The map can be downloaded to the vehicle via a server data handler and a client data handler.

Further disclosed is a computer readable medium, storing program instructions for executing some or all of the above method steps. Further disclosed is a computer programmed for executing some or all of the above method steps, including a computer apparatus, programmed to, based on sensor data in a vehicle, determining a database that includes object data for a plurality of objects, including, for each object, a respective location, an object identification, a measurement of a physical attribute of the object, and an uncertainty specifying a probability of correct object identification, for a type of the vehicle, for the object identification and the physical attribute determined based on the sensor data, wherein the physical attribute includes an object location. A map can be determined based on the database including the respective locations and corresponding uncertainties for the vehicle type and the map can be downloaded to a vehicle based on a vehicle location and the vehicle type. A computer in the vehicle can include a vehicle computer processor and a vehicle computer memory including instructions executable by the vehicle computer processor to operate the vehicle based on the downloaded map. The object can include one or more of a vehicle and a pedestrian. The vehicle sensor data can include one or more of vehicle video sensor data, vehicle lidar sensor data, vehicle radar sensor data, and vehicle ultrasound sensor data. The vehicle type can include one or more of a vehicle make and a vehicle model.

The computer can be further programmed to determine the uncertainties by combining uncertainties for one or more objects with a same location and reported by a plurality of second vehicles of the same vehicle type. The database can be determined by combining the uncertainty with environmental conditions including one or more of time of day, season, and weather conditions. The object data can include a velocity of the object, wherein velocity includes object speed and object direction. The object data can be determined by processing vehicle sensor data with a deep neural network to determine the object physical attribute, the object identity and the uncertainty. The map can be input to the deep neural network to determine the object identity, the object physical attribute and the uncertainty. The deep neural network can be trained based on the map. The map can include one or more hotspots, wherein each hotspot includes a real-world location and the uncertainty corresponding to the real-world location. The one or more hotspots can include a vehicle make and model. The map can be downloaded to the vehicle via a server data handler and a client data handler.

Figure 1:
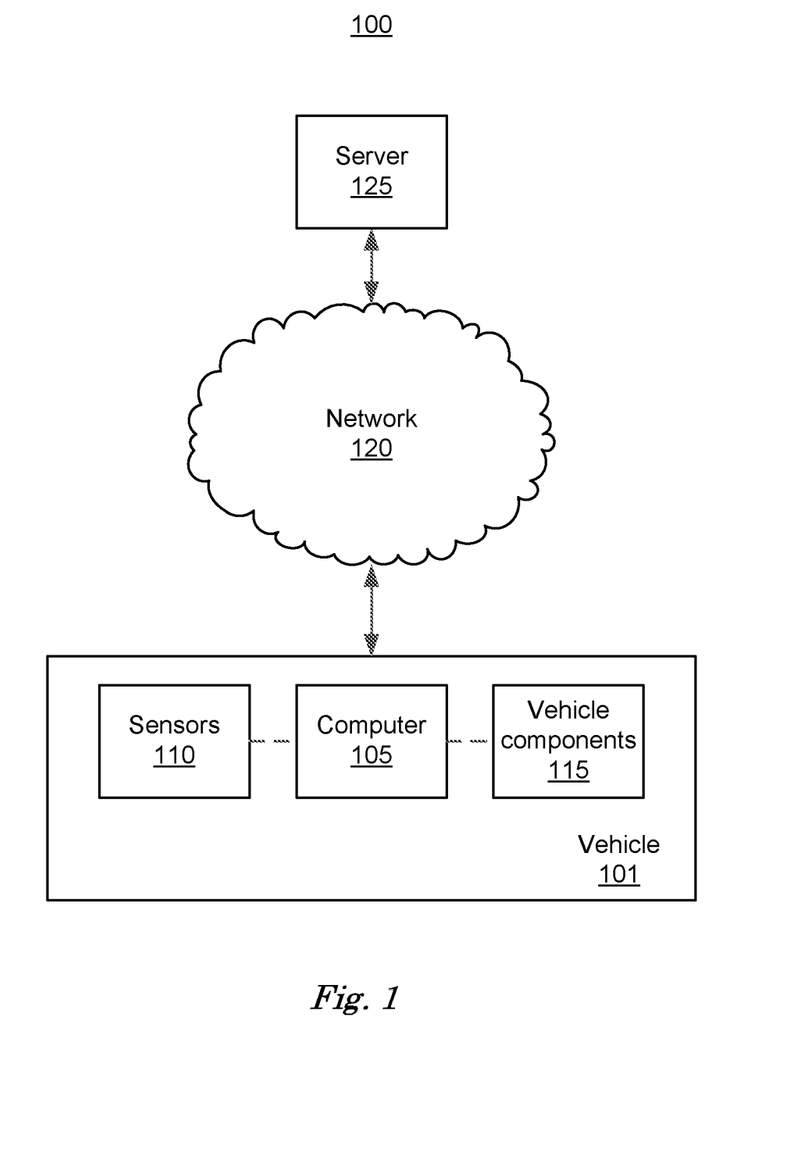
FIG. 1 is a diagram of an example traffic infrastructure system.

FIG. 1 is a diagram of a traffic infrastructure system 100 that includes a vehicle 101 operable in autonomous ("autonomous" by itself in this disclosure means "fully autonomous"), semi-autonomous, and occupant piloted (also referred to as non-autonomous) mode. One or more vehicle 101 computing devices 105 can receive data regarding the operation of the vehicle 100 from sensors 101. The computing device 105 may operate the vehicle 101 in an autonomous mode, a semi-autonomous mode, or a non-autonomous mode.

The computing device 105 includes a processor and a memory such as are known. Further, the memory includes one or more forms of computer-readable media, and stores instructions executable by the processor for performing various operations, including as disclosed herein. For example, the computing device 105 may include programming to operate one or more of vehicle brakes, propulsion (e.g., control of acceleration in the vehicle 101 by controlling one or more of an internal combustion engine, electric motor, hybrid engine, etc.), steering, climate control, interior and/or exterior lights, etc., as well as to determine whether and when the computing device 105, as opposed to a human operator, is to control such operations.

The computing device 105 may include or be communicatively coupled to, e.g., via a vehicle communications bus as described further below, more than one computing devices, e.g., controllers or the like included in the vehicle 101 for monitoring and/or controlling various vehicle components 115, e.g., a powertrain controller, a brake controller, a steering controller, etc. The computing device 105 is generally arranged for communications on a vehicle communication network, e.g., including a bus in the vehicle 101 such as a controller area network (CAN) or the like; the vehicle 101 network can additionally or alternatively include wired or wireless communication mechanisms such as are known, e.g., Ethernet or other communication protocols.

Via the vehicle network, the computing device 105 may transmit messages to various devices in the vehicle and/or receive messages from the various devices, e.g., controllers, actuators, sensors, etc., including sensors 101. Alternatively, or additionally, in cases where the computing device 105 actually comprises multiple devices, the vehicle communication network may be used for communications between devices represented as the computing device 105 in this disclosure. Further, as mentioned below, various controllers or sensing elements such as sensors 101 may provide data to the computing device 105 via the vehicle communication network.

In addition, the computing device 105 may be configured for communicating through a vehicle-to-infrastructure (V-to-I) interface with a server 125, e.g., a cloud server or remote server computer, via a network 120, which, as described below, includes hardware, firmware, and software that permits computing device 105 to communicate with a server 125 via a network 120 such as wireless Internet (WI-FI®) or cellular networks. Computing device 105 may be configured accordingly including processors, memory, transceivers, etc., configured to utilize various wired and/or wireless networking technologies, e.g., cellular, BLUETOOTH® and wired and/or wireless packet networks. Computing device 105 may be configured for communicating with other vehicles 101 using vehicle-to-vehicle (V-to-V) networks, e.g., according to Dedicated Short Range Communications (DSRC) and/or the like, e.g., formed on an ad hoc basis among nearby vehicles 101 or formed through infrastructure-based networks via V-to-I communications. The computing device 105 also includes nonvolatile memory such as is known. Computing device 105 can log data by storing the data in nonvolatile memory for later retrieval and transmittal via a vehicle communication network to a server 125 or a user mobile device. Server 125 is a computing device that can be included in a roadside infrastructure, or edge, computing node, where an edge computing node is a server 125 or computing device 105 included in or on a stationary infrastructure element such as a pole, a bridge, a wall, building, etc., and that acquires sensor data and communicates with vehicles 101 via a V-to-I interface or the like in a local portion of one or more of a roadway, parking lot or parking structure, etc.

As already mentioned, generally included in instructions stored in the memory and executable by the processor of the computing device 105 is programming for operating one or more vehicle components 115, e.g., braking, steering, propulsion, etc., without intervention of a human operator. Using data received in the computing device 105, e.g., the sensor data from the sensors 101, the server 125, etc., the computing device 105 may make various determinations and/or control various vehicle components 115 and/or operations without a driver to operate the vehicle 101. For example, the computing device 105 may include programming to regulate vehicle 101 operational behaviors (i.e., physical manifestations of vehicle 101 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller, a brake controller, and a steering controller. A controller may be an electronic control unit (ECU) such as is known, possibly including additional programming as described herein. The controllers may communicatively be connected to and receive instructions from the computing device 105 to actuate the subsystem according to the instructions. For example, the brake controller may receive instructions from the computing device 105 to operate the brakes of the vehicle 101.

The one or more controllers for the vehicle 101 may include known electronic control units (ECUs) or the like including, as non-limiting examples, one or more powertrain controllers, one or more brake controllers, and one or more steering controllers. Each of the controllers may include respective processors and memories and one or more actuators. The controllers may be programmed and connected to a vehicle 101 communications bus, such as a controller area network (CAN) bus or local interconnect network (LIN) bus, to receive instructions from the computing device 105 and control actuators based on the instructions.

Sensors 101 may include a variety of devices known to provide data via the vehicle communications bus. For example, a radar fixed to a front bumper (not shown) of the vehicle 101 may provide a distance from the vehicle 101 to a next vehicle in front of the vehicle 101, or a global positioning system (GPS) sensor disposed in the vehicle 101 may provide geographical coordinates of the vehicle 101. An inertial measurement unit (IMU) sensor can use accelerometers to determine vehicle 101 three-dimensional location and orientation. The distance(s) provided by the radar and/or other sensors 101 and/or the geographical coordinates provided by the GPS and/or IMU sensors may be used by the computing device 105 to operate the vehicle 101 autonomously or semi-autonomously, for example.

The vehicle 101 is generally a land-based vehicle 101 capable of autonomous and/or semi-autonomous operation and having three or more wheels, e.g., a passenger car, light truck, etc. The vehicle 101 includes one or more sensors 101, the V-to-I interface, the V-to-V interface, the computing device 105 and vehicle components 115 including one or more controllers. The sensors 101 may collect data related to the vehicle 101 and the environment in which the vehicle 101 is operating. By way of example, and not limitation, sensors 101 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 101 may be used to sense the environment in which the vehicle 101 is operating, e.g., sensors 101 can detect phenomena such as weather conditions (precipitation, external ambient temperature, etc.), the grade of a road, the location of a road (e.g., using road edges, lane markings, etc.), or locations of target objects such as neighboring vehicles 101. The sensors 101 may further be used to collect data including dynamic vehicle 101 data related to operations of the vehicle 101 such as velocity, yaw rate, steering angle, engine speed, brake pressure, oil pressure, the power level applied to vehicle components 115 in the vehicle 101, connectivity between vehicle components 115, and accurate and timely performance of vehicle components 115.

Figure 2:
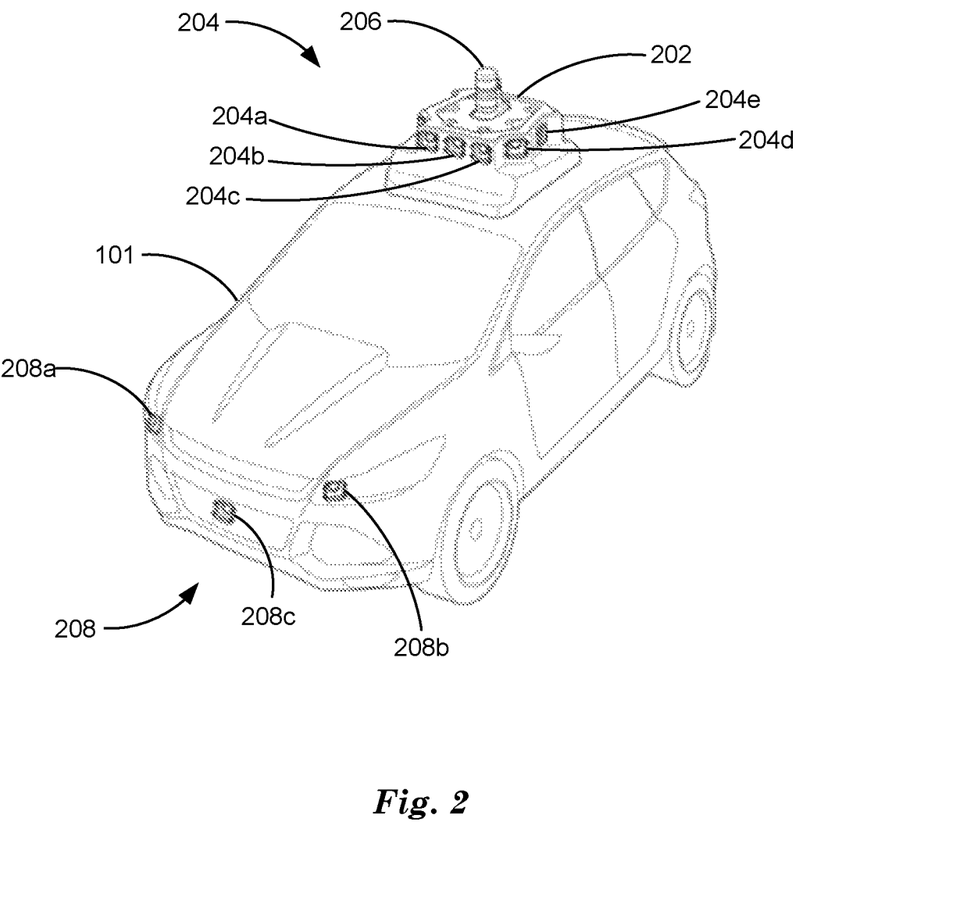
FIG. 2 is a diagram of an example vehicle with sensors.

FIG. 2 is a diagram of a vehicle 101 including a plurality of sensors 101 corresponding to multiple sensor modalities. A sensor modality means a medium in which a sensor detects physical phenomena, e.g., an acoustic medium, a portion of the electromagnetic spectrum, etc. Sensor modalities can include lidar, video, radar and ultrasound, for example. Sensors 101 include a lidar sensor 206 and video sensors 204a, 204b, 204c, 204c, (collectively video sensors 204), all included in a sensor pod 202 attached to the roof portion of vehicle 101. Vehicle 101 also includes radar sensors 208a, 208b, 208c, (collectively radar sensors 208) included in a body portion of vehicle 101. A computing device 105 can acquire data from lidar sensor 206, video sensors 204 and radar sensors 208 and use the acquired data to operate vehicle 101 on a roadway. Operating a vehicle on a roadway can include detecting locations of objects including vehicles and pedestrians and avoiding contact with the objects.

Figure 3:
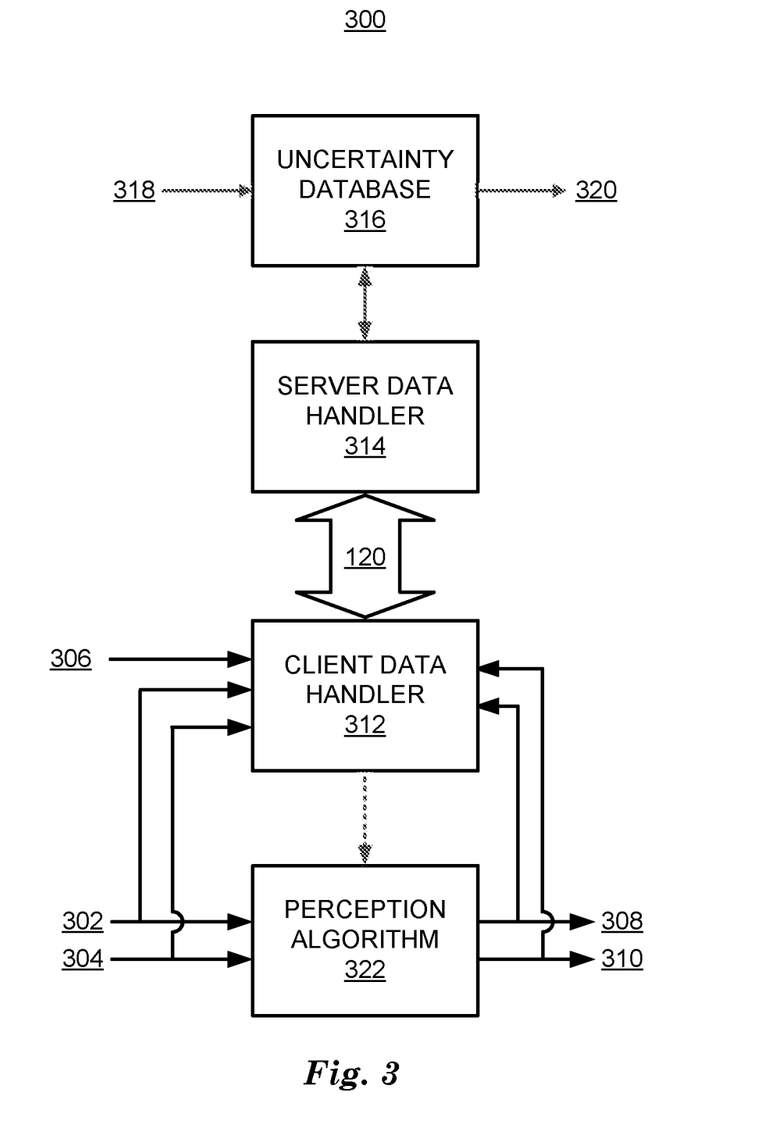
FIG. 3 is a diagram of an example system including a vehicle object database.

FIG. 3 is a diagram of an uncertainty sharing system 300. An uncertainty is a number between 0.0 and 1.0 that corresponds to a probability a perception algorithm 322 has incorrectly identified an object. An uncertainty between 0.0 and 1.0 can also be expressed as a percentage between 0 and 100. An uncertainty sharing system 300 stores uncertainty data in an uncertainty database 316. Uncertainty data is defined as a data structure that includes an uncertainty and related data used to determine and locate the uncertainty. Uncertainty data is an uncertainty, sensor data 302, location and mapping data 304, environmental and vehicle data 306, object data 308, and an uncertainty map 310. Sensor data 302 is generated by vehicle sensors as described above in relation to FIG. 2 including video sensors 204, lidar sensors 206 and radar sensors 208. Location and mapping data 304 is vehicle 101 real-world location and orientation data generated by GPS and IMU sensors included in a vehicle 101. Location and mapping data 304 also includes map data. Map data is a diagram illustrating the geography around a vehicle 101. Map data can be obtained from a source such as GOOGLE™ maps and stored in computer 105 memory or downloaded from a server 125 via a network 120. Location and mapping data 304 can be used to determine a location and orientation of a vehicle 101 in real-world coordinates with respect to a map of an environment around the vehicle 101.

Environmental and vehicle data 306 can include temperature, humidity, precipitation, time of day, etc. Some environmental data, such as temperature and humidity can be acquired directly from vehicle sensors 101 or downloaded from a server 125 via a network 120. Other environmental data can be downloaded from the Internet, for example a weather report including atmospheric conditions at the location of a vehicle 101. Environmental and vehicle data 306 includes vehicle make and model data including year of manufacture. Vehicle make and model data can be recalled from data stored in memory included in computer 105 and can include the types and locations of vehicle sensors 110.

Object data 308, and an uncertainty map 310 can be generated by a perception algorithm 322. Object data 306 is a data structure that includes data regarding an object determined by perception algorithm 322 including object identity, object size, object shape, object location, object speed and object direction. Object identity is a label that identifies the type of object. Object identity can be pedestrian, vehicle, animal, or unknown, for example. A perception algorithm 322 is a software program executing on a computer 105 included in a vehicle 101. A perception algorithm 322 can include a deep neural network that inputs vehicle sensor data 302 output by vehicle sensors including video sensors 204, lidar sensors 206, and radar sensors 208. Perception algorithm 322 processes the input sensor data 302 to determine data regarding objects in the environment around a vehicle 101. A deep neural network is a software program that includes a plurality of convolutional layers and a plurality of fully-connected layers. A deep neural network can be trained using a plurality of test images accompanied by corresponding ground truth data. Ground truth data is defined as data corresponding to correct results to be output by the deep neural network in respond to input image data, i.e., data that is deemed to accurately represent the physical world. Ground truth data can be determined by user input based on measuring input image data manually to detect, identify and locate objects in an image, for example.

Perception algorithm 322 can detect and identify objects in a field of view of a vehicle sensor, for example vehicles and pedestrians. An object is defined as a portion of an image formed by sensor data that can be distinguished from the remaining portions of the image based on processing the pixel data that forms the image. Object detection is defined as separating portions of an image corresponding to one or more objects, referred to as the foreground, from the rest of the image, referred to as the background. A perception algorithm 322 can perform object detection by image segmentation, which separates foreground portions of an image from background portions of an image based on pixel values such as intensity and color to determine image portions with similar intensities or colors. Image segmentation can be performed processing pixel values to form edges and determining foreground portions bounded by determined edges. In examples where perception algorithm 322 includes a deep neural network, object identification is performed by training the deep neural network using a dataset of training images that include examples of objects and ground truth identifying the objects. Ground truth can be determined by users inspecting the dataset of training images and manually identifying objects. The training images are input to the deep neural network and output from the deep neural network is back propagated to compare to the ground truth. Processing of training images continues until results that agree with the ground truth are output and back propagated.

A perception algorithm 322 can determine object attributes, where object attributes are data that specify physical measurements of objects, typically including object size, object shape, object location, object speed, and object direction. Object size is an estimate of an object's real-world size, estimated by measuring an outline of an object in an image acquired by a vehicle sensor. Object size can be estimated by counting contiguous image pixels in an object segmented from an image background, for example. Object shape is a measure of an outline of an object in an image that can be used, along with object size, to identify an object. For example, pedestrians and vehicles will have different object sizes and object shapes. Object shape can be determined by the ratio of height to width of a bounding rectangle formed around a detected object, for example. Object shape can also be measured by correlating a detected object with templates corresponding to expected objects. For example, templates can be determined by processing expected objects including vehicles and pedestrians in sample images. A user can process sample images to determine an outline of the expected objects and form a binary template based on the determined outline. A deep neural network can be trained to output object physical size and shape by training the deep neural network using ground truth for object size and shape determined by inspection of the training data set by a user.

Object location is an estimate of a real-world location of an object estimated by determining a location of the pixels corresponding to the object in an image acquired by vehicle sensors. Object location can be estimated by a deep neural network included in a perception algorithm 322. Ground truth regarding a location in real-world coordinates determined with respect to a vehicle 101 can be determined by measuring the real-world location of objects in sensor data acquired by vehicle sensors. Because a vehicle sensor does not change location and orientation with respect to the vehicle 101, the real-world location of objects in a field of view of a sensor can be determined by the location of the object in an array of pixel data corresponding to the sensor data output from a vehicle sensor. This technique depends upon objects being on a ground plane corresponding to a roadway upon which the vehicle 101 is operating. A deep neural network can be trained to estimate object location for objects located on a roadway based on a training data set with example objects and corresponding ground truth regarding the real-world location of the objects.

A perception algorithm 322 can determine a direction and speed of travel of detected objects measured with respect to vehicle 101. For example, data regarding the location of an object can be acquired over one or more time steps to determine an object speed and direction. Perception algorithm 322 outputs object data 306. Perception algorithm 322 can also determine uncertainties regarding the object identity, object size, object shape, object location, object speed, and object direction, and include the uncertainty in the output object data 308. In this context, uncertainty is defined as a probability that the perception algorithm 322 has determined each of the object size, object shape, object location, object speed, and object direction correctly. In examples where an uncertainty is determined for each of the object attributes including object identity, object size, object shape, object location, object speed, and object direction, uncertainty can be determined by averaging the individual uncertainties or taking the maximum of the uncertainties. Depending upon environmental conditions determining the object attributes using sensor data 302 can be more or less uncertain. For example, identifying and locating a pedestrian in video data can be more uncertain at night than during the day. Other environmental conditions that make determination of object attributes more uncertain include inclement weather, for example rain and snow, and atmospheric conditions including fog and dust.

A computer 105 included in a vehicle 101 can use object data 308 to determine a vehicle path upon which to operate a vehicle 101. For example, a computer 105 can determine a vehicle path that avoids contact with an object such as a vehicle or a pedestrian. The uncertainty corresponding to the object identity, speed, and direction can be used by a computer 105 in determining a vehicle path. In an example where a perception algorithm 322 has identified an object in the environment around a vehicle 101 with high uncertainty (>80%), the computer 105 can determined a vehicle path that avoids the identified object at a greater distance, because the identity of the object has a higher probability of being incorrect. For example, the object might be moving at a greater speed or in a different direction than the speed and direction output as object data 308 by the perception algorithm.

Perception algorithm 322 can determine uncertainty by processing input sensor data 302. A deep neural network included in perception algorithm 322 can be trained to output uncertainty along with the object identification and location data. A deep neural network can be trained to output uncertainty using a training data set that includes estimated uncertainty in the ground truth in addition to object location and identity data. The estimated uncertainty in the ground truth can be determined by having human observers rate uncertainty in the training data set based on observed characteristics in the input training image data. A human observer can estimate how uncertain the deep neural network will be in identifying an object based on how well one or more human observers can identify the object. Observed characteristics in the input training image data can include the presence or absence of atmospheric conditions such as rain, snow, and fog. Observed characteristics can also include lighting conditions such as night or glare from bright sunlight. Based on the ground truth in the training data set the deep neural network can be trained to output an uncertainty that corresponds to a probability that the perception algorithm 300 incorrectly identifies an object.

Uncertainty can also be estimated for training a deep neural network by processing contrast ratios and spatial frequencies included in image data using image processing software. Contrast ratios refers to comparisons of grayscale values or color saturation between portions of an image. An image can be divided into contiguous regions having similar grayscale values or color saturation values. For example, a contiguous region can be formed by grouping pixels that all differ from an average grayscale or color saturation value by less than 10%. Contrast ratios compare average grayscale or color saturation values between regions. Low contrast images having average contrast ratios of less than about two correspond to images having environmental conditions in which identification of objects will have high uncertainty, such as rain, snow, fog, or dim lighting, for example.

Another calculation that can be applied to input sensor data to determine uncertainty is spatial frequency analysis. Spatial frequency refers to features of an image that correspond to values that would occur in a two-dimensional Fourier transform of the image. For example, large, smooth features in an image correspond to low spatial frequencies and small, detailed features correspond to high spatial frequencies. A perception algorithm can analyze the spatial frequencies present in input image data by applying low pass and high pass filters to the input image data to determine a ratio of low spatial frequencies to high spatial frequencies. Input images that have a greater ratio of low spatial frequencies to high spatial frequencies have greater uncertainty of correct identification. High ratios of low spatial frequencies to high spatial frequencies correspond to low visibility conditions such as rain, snow, fog or dim lighting.

Perception algorithm 322 can input location and mapping data 304 regarding the location and orientation a vehicle 101 to permit perception algorithm 322 to determine where located objects are in real-world coordinates. Location and mapping data 304 can be combined with object location data and uncertainty data to create an uncertainty map 310. An uncertainty map 310 includes locations in the environment around a vehicle 101 in real-world coordinates tagged with object data 308 including uncertainties regarding the object attributes.

Real-world location and orientation of vehicle sensors 101 can be determined by measuring respective locations and orientations of vehicle sensors 101 with respect to a vehicle 101 at the time the vehicle sensors 101 are installed in the vehicle 101; typically the sensor 101 measurements can then be provided according to a calibration of the sensor 101 to its installation location and orientation. The location and orientation of vehicle sensors 101 can be determined for such calibration by acquiring data including a fiducial target placed at a measured location in the field of view of a vehicle sensor 110, for example.

Client data handler 312 receives uncertainty data as input. Uncertainty data is a data structure that includes sensor data 302, location and mapping data 304, environmental and vehicle data 306, object data 308, and an uncertainty map 310 which includes an uncertainty determined by perception algorithm 322, as discussed above in relation to FIG. 3. Client data handler 312 is a software program executing on a computer 105 included in a vehicle 101. The client data handler formats the uncertainty data into one or more uncertainty data packets for transmission while filtering out data regarding the identity of the object.

An uncertainty data packet is a data packet, i.e., digital data that includes a plurality of fields in addition to uncertainty data. An uncertainty data packet can include an identifier field that identifies the data packet as an uncertainty data packet. The uncertainty data packet can be of fixed length or include a field that corresponds to the length. The uncertainty data packet includes all or a portion of the uncertainty data. The uncertainty data can be included in a single packet or divided up over multiple packets. The uncertainty data packet can include a sequence number that corresponds to the order in which the uncertainty data is divided into packets that can be used to extract the uncertainty data from the uncertainty data packets. The uncertainty data packet can also include a checksum that is used to detect transmission errors. Client data handler 312 manages the transmission of the uncertainty data packets to a server data handler 314 via a network 120.

Server data handler 314 is a software program executing on a cloud-based server 125, for example. Server data handler 314 receives uncertainty data packets from a plurality of vehicles 101. Server data handler 314 can use sequence numbers and checksums included in the uncertainty data packets to ensure that uncertainty data packets have been received in the correct order and without error. If server data handler 314 determines that an uncertainty data packet is missing or includes transmission errors, server data handler 314 can request re-transmission of one or more uncertainty data packets from client data handler 312. Sever data handler 314 unpacks the uncertainty data packets, reassembles the uncertainty data if required and stores the unpacked uncertainty data in the uncertainty database 316. The uncertainty data is indexed and stored in the uncertainty database 316 according to geographic location and make and model of vehicle.

Server data handler 314 can receive uncertainty data packets from a plurality of vehicles 101 at a plurality of geographic locations and unpack and store the uncertainty data in the uncertainty database 316. Queries 318 can be received by the uncertainty database 316 from vehicles 101 and other programs executing on computers in communication with server 125 requesting uncertainty data from the uncertainty database 316. Queries 318 can request uncertainty data by specifying attributes regarding the uncertainty data. Attributes of the uncertainty data are data that are used to index into the database to access uncertainty data. Attributes can include data specifying geographic location, vehicle make and model, and environmental conditions. In response to a query 318, uncertainty database 316 aggregates uncertainty data based on the attributes included in the query to form an uncertainty hotspot and outputs 320 the uncertainty hotspot. An uncertainty hotspot is a real-world location that includes an uncertainty regarding object identification at that real-world location. Associating a real-world location with uncertainty data can be referred to as "geotagging" the uncertainty data. Uncertainty hotspots can be output as a map that includes object uncertainties regarding probabilities of incorrect identification of objects at each uncertainty hotspot included in the map. Uncertainty hotspots can be output 320 from uncertainty database 316 in response to a query 318 from server data handler 314 or from another software program running on server 125 or another computing device in communication with server 125.

Uncertainty hotspot data can be filtered by uncertainty database 316 prior to being output 320 to ensure that the uncertainty hotspot data includes only uncertainty hotspots that pertain to the query 318 received by the uncertainty database 316. For example, a query 318 can request uncertainty hotspot data that includes only a certain make and model of vehicle or only includes uncertainty data that was collected in certain environmental conditions, such as inclement weather or nighttime.

Figure 4:
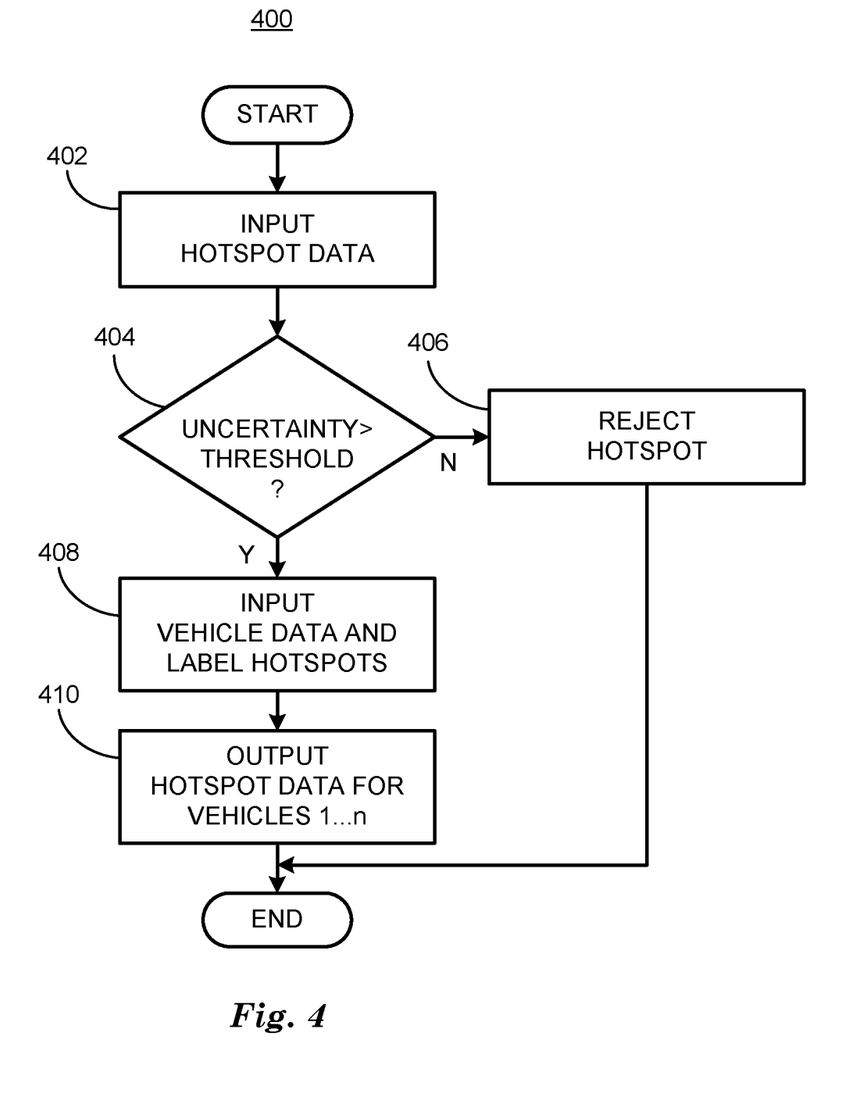
FIG. 4 is a flowchart diagram of an example process to determine vehicle hotspot data.

FIG. 4 is a flowchart diagram of a process 400, described in relation to FIGS. 1-3, for determining uncertainty hotspots. Process 400 can be implemented by a processor of computing device, taking as input information from sensors, and executing commands, and outputting object information, for example. Process 400 includes multiple blocks that can be executed in the illustrated order. Process 400 could alternatively or additionally include fewer blocks or can include the blocks executed in different orders.

Process 400 begins at block 402, where uncertainty database 316 executing on a server 125 receives as input a query 318. The query 318 can be received via a network 120 from a client data handler 312 via a server data handler 314 or from a software program running on server 125 or a computing device in communication with server 125. A query can be a request for data regarding uncertainty hotspots for an environment around a vehicle 101. The query can include a real-world location for the vehicle 101 and the direction and speed at which the vehicle 101 is traveling. The query can also include data regarding the make and model of the vehicle 101 including the type and setup or arrangement of vehicle sensors 101 included in the vehicle 101. The query can also include data regarding the environmental conditions around the vehicle 101 including time of day, season, and weather conditions that can affect the performance of vehicle sensors 101.

At block 404 the uncertainty database 316 retrieves uncertainty hotspot data corresponding to the query 318 based on the attributes included in the query 318. The uncertainty database 316 can test each retrieved uncertainty hotspot to compare the uncertainty level corresponding to each hotspot with a threshold. The threshold can be selected by a user based on empirical data that compares an uncertainty level with the performance of a perception algorithm 322 in a vehicle 101. An uncertainty can be selected as the uncertainty threshold below which a high percentage, for example 95%, of objects located at the hotspot are correctly identified by a perception algorithm 322 in the environmental conditions specified in the attributes included in the query 318.

At block 406, the hotspots output from a database included in the data repository 302 having an uncertainty less than the threshold are rejected. This means that hotspots having a high probability of correctly identifying objects are rejected. Rejecting a hotspot means that the hotspot is not passed onto block 408 for further processing.

At block 408, the hotspots output from a database included in the data repository 302 having an uncertainty greater than the threshold are passed on for further processing. A block 408, vehicle data regarding the make and model of a vehicle 101 is received from a client data handler 310 via a network 120 and a server data handler 308. The vehicle 101 make and model data includes data regarding the type and setup of sensors 101 included in the vehicle. At block 408 the uncertainty hotspots are labeled with the vehicle 101 make and model data included in the uncertainty database 316.

At block 410 the labeled uncertainty hotspots are output 320. The labeled uncertainty hotspots can be included in a map. Uncertainty hotspot data and uncertainty hotspot maps can be output 320 to software programs running on server 125, computing devices in communication with server 125 or to a perception algorithm 322 included in a vehicle 101 via server data handler 314 and client data handler 312. This is represented by the dotted line in FIG. 3. A perception algorithm 322 can use the uncertainty hotspots to combine with uncertainty map 310 generated by the perception algorithm 322. A computer 105 included in a vehicle 101 can use the combined uncertainty hotspot data and uncertainty map 310 to determine a vehicle path upon which to operate the vehicle 101, for example. Following block 410 process 400 ends.

Uncertainty hotspot data can be used to improve operation of a vehicle 101. A map including uncertainty hotspots tagged with uncertainties corresponding to each hotspot can be downloaded by a client data handler 312 in a vehicle 101 to assist the vehicle 101 in determining objects in an environment around the vehicle 101. While a deep neural network used as a perception algorithm 322 can be trained using a large dataset that includes 1000's of images, it is generally not possible to train deep neural networks using images of every location they will be expected to encounter in operating a vehicle 101. By including uncertainty data regarding hotspots or locations that the deep neural network was not trained on, combined uncertainties determined by a plurality of vehicles 101 regarding a particular hotspot can be downloaded to a perception algorithm 322 to compare against an uncertainty map 310 calculated by the in-vehicle perception algorithm 322. The combined uncertainty based on data from a plurality of vehicles 101 can be more accurate than an uncertainty determined by processing sensor data from a particular location for the first time.

An uncertainty sharing system 302 can improve operation of fleet vehicles 101 being controlled by computing devices in communication with a server 125. An uncertainty sharing system 300 can be used to identify uncertainty hotspots where, because of the location, perception algorithms 300 executing on computers 105 included in a vehicle 101, tend to be more uncertain for a particular make and model vehicle 101. Routing algorithms executing on cloud-based computing devices can receive output 320 uncertainty hotspots that include locations with a high uncertainty of correctly identifying objects, and use an uncertainty hotspot map to plan a route based on the uncertainty hotspot map. An uncertainty sharing system 300 can improve operation of vehicles 101 by permitting a cloud-based computer system that manages fleets of vehicles 101 to use hotspot data to plan routes for vehicles 101 that avoid high uncertainty hotspots, for example.

An uncertainty sharing system 300 can improve operation of vehicles 101 by permitting a software program executing on a cloud-based computer to compare uncertainty hotspots across different makes and models of vehicles with different vehicle sensor 110 setups. Comparison of uncertainty hotspots between different vehicle sensor 110 setups can be used to determine which vehicle sensors 101 perform best in identifying objects in various environmental conditions. Comparison data can be used to design future vehicles 101 or to select vehicles 101 for use in certain areas during certain environmental conditions. For example, some vehicle sensor 110 setups can perform better in winter weather conditions than other vehicle sensor 110 setups. Relative performance of vehicle sensor 110 setups can be determined by comparing uncertainty hotspots based on environmental conditions. Evaluating vehicle sensor 110 performance in this fashion can improve vehicle designs by permitting vehicle designers to determine least expensive vehicle sensor 110 configurations for a given level of hotspot uncertainty.

An uncertainty sharing system 300 can improve operation of vehicles 101 by using uncertainty hotspots to train perception algorithms, including deep neural networks. Sensor data 302 uploaded to uncertainty database 316 can be used to train perception algorithms including deep neural networks to detect and identify objects in sensor data 302. Adding additional training data based on uncertainty hotspots can improve the ability of perception algorithms to detect and identify objects in Sensor data 302 data by providing more training examples from locations determined to exhibit high uncertainty in identifying objects. Training of deep neural networks to identify objects can be improved by providing more training data corresponding to high uncertainty locations.

An uncertainty sharing system 300 can improve operation of vehicles 101 by using uncertainty hotspots to perform quality checks on vehicle sensors 101. By comparing downloaded uncertainty hotspots with uncertainty maps 310 output from a vehicle 101 perception algorithm, a computer 105 in a vehicle 101 can determine whether the sensor data 302 input to the perception algorithm 322 is faulty or might require re-calibration. Vehicle sensors 101, if operating properly, should be able to produce uncertainty hotspot results that match uncertainty hotspot results for similar sensors included in similar vehicles 101 in similar environmental conditions. If a vehicle sensor 110 is producing uncertainty results that are worse than expected, a computer 105 included in a vehicle 101 can alert an occupant of the vehicle or a control program in a cloud-based computer that a problem has been detected with a vehicle sensor 110. Upon receipt of an alert, appropriate testing and service can be performed on the vehicle 101 to ensure that the vehicle sensors 110 are operating normally.

Figure 5:
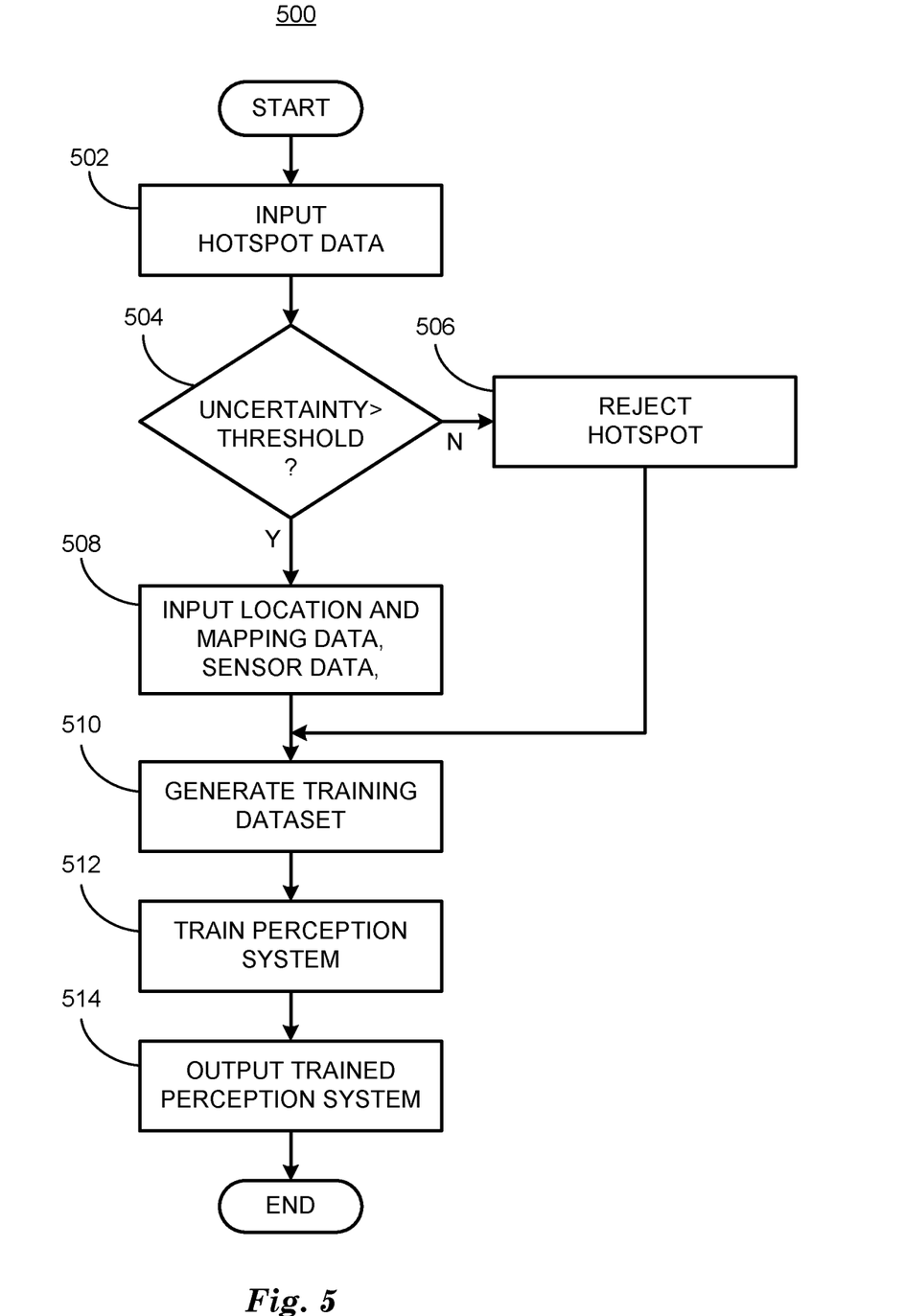
FIG. 5 is a flowchart diagram of an example process to train vehicle perception algorithms based on vehicle hotspot data.

FIG. 5 is a flowchart diagram of a process 500 described in relation to FIGS. 1-4, of a process 500 for training a perception algorithm based on uncertainty hotspots. Process 500 can be implemented by a processor of computing device, taking as input information from sensors, and executing commands, and outputting object information, for example. Process 500 includes multiple blocks that can be executed in the illustrated order. Process 500 could alternatively or additionally include fewer blocks or can include the blocks executed in different orders.

Process 500 begins at block 502, where an uncertainty sharing system 300 executing on a server 125 computer receives as input data regarding uncertainty data can including sensor data 302, location and mapping data 304, environmental and vehicle data 306, object data 308, and an uncertainty map 310 from vehicles 101 via client data handler 312 and server data handler 314 as discussed above in relation to FIG. 3. Input data is included in uncertainty database 316. Input data can be organized as uncertainty hotspot data in the uncertainty database 316.

At block 504 uncertainty hotspot data is compared to a threshold to determine whether the uncertainty is greater than the threshold. The threshold can be determined as discussed above in relation to FIG. 4. Low uncertainty hotspots, meaning hotspots that have a high probability (>90%, for example) of including correct identification of objects, are passed to block 506, where the hotspots are rejected from further processing. High uncertainty hotspots, meaning hotspots that do not have a high probability of including correctly identified objects, (<90%, for example) are passed to block 508 for further processing.

At block 506, the hotspots output from a database included in the data repository 302 having an uncertainty threshold less than the threshold are rejected. Rejecting a hotspot means that the hotspot is not passed onto block 508 for further processing.

At block 508, vehicle location and mapping data 304, and sensor data 304 are combined with the hotspot data.

At block 510 the hotspot data including uncertainty data is combined with vehicle location and mapping data 304, and sensor data 302 to determine a training dataset for a deep neural network included in perception algorithm 322. Determining a training dataset includes determining ground truth for object location and identification and uncertainty. Ground truth for training the deep neural network to output object data 308 can be determined by identifying and locating objects in the sensor data 302 by user inspection. The uncertainty and the hotspot location obtained from the uncertainty database 316 can be used to train the deep neural network to output an uncertainty map 310.

At step 512 the training dataset including ground truth based on hotspot data used to train a perception algorithm 322 to identify objects in sensor data 302 and output an uncertainty map 310. The perception algorithm 322 can be a deep neural network as discussed above in relation to FIG. 3.

At step 514 the trained perception algorithm 322 can be output to a vehicle 101. Outputting a trained perception algorithm 322 can include downloading the trained perception algorithm 322 from a server 125 included in a traffic information system 100 to a vehicle 101 via a network 120. Training a perception algorithm 322 based on hotspot data included in a data repository 302 database can improve performance of a perception algorithm 322 by including training data for the particular make and model of vehicle 101 including the types of sensors 110 included in the vehicle 101. The hotspot data is processed at block 504 to include hotspots correlated with high uncertainty. This permits the perception algorithm 322 to be trained to recognize locations where object identification is difficult, e.g. highly uncertain, and output that uncertainty to a computer 105 included in a vehicle 101. Recognizing locations where object identification is highly uncertain can permit computer 105 to determine a vehicle path that avoids highly uncertain locations. Following step 514 process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a management computer including:
    a processor; and
    a memory, the memory including instructions executable by the processor to:
        based on sensor data in a first vehicle, determine a database that includes object data for a plurality of objects, including, for each object, an object identification, a measurement of one or more object attributes, and an uncertainty specifying a probability of correct object identification for the object identification and the object attributes determined based on the sensor data, wherein the object attributes include an object size, an object shape, and an object location;
        determine an uncertainty map based on the database including uncertainties in the respective locations and corresponding uncertainties for a vehicle type, wherein the uncertainty map indicates locations with a high uncertainty of locating objects; and
        download the uncertainty map to a second vehicle based on the second vehicle location and the second vehicle type wherein the uncertainty map is used to plan a vehicle route that avoids high uncertainty locations.

2. The system of claim 1, further comprising a computer in the second vehicle including a vehicle computer processor and a vehicle computer memory including instructions executable by the vehicle computer processor to operate the second vehicle based on the downloaded uncertainty map.

3. The system of claim 1, wherein the object includes one or more of a third vehicle and a pedestrian.

4. The system of claim 1, wherein the vehicle sensor data includes one or more of vehicle video sensor data, vehicle lidar sensor data, vehicle radar sensor data, and vehicle ultrasound sensor data.

5. The system of claim 1, wherein the first and second vehicle types include one or more of a vehicle make and a vehicle model.

6. The system of claim 1, the instructions including further instructions to determine the uncertainties by combining uncertainties for one or more objects with a same location and reported by a plurality of vehicles of the vehicle type.

7. The system of claim 1, the instructions including further instructions to determine the database by combining the uncertainty with environmental conditions including one or more of time of day, season, and weather conditions.

8. The system of claim 1, wherein the object attributes include object speed and object direction.

9. The system of claim 1, the instructions including further instructions to determine the object data by processing vehicle sensor data with a deep neural network to determine the object attributes, the object identity and the uncertainty.

10. The system of claim 9, wherein the map is input to the deep neural network to determine the object identity, the object attributes and the uncertainty.

11. The system of claim 10, wherein the deep neural network is trained based on the map.

12. A method, comprising:
    based on sensor data in a first vehicle, determine a database that includes object data for a plurality of objects, including, for each object, an object identification, a measurement of one or more object attributes, and an uncertainty specifying a probability of correct object identification for the object identification and the object attributes determined based on the sensor data, wherein the object attributes include an object size, an object shape, and an object location;
    determine an uncertainty map based on the database including uncertainties in the respective locations and corresponding uncertainties for a vehicle type, wherein the uncertainty map indicates locations with a high uncertainty of locating objects; and
    download the uncertainty map to a second vehicle based on the second vehicle location and the second vehicle type wherein the uncertainty map is used to plan a vehicle route that avoids high uncertainty locations.

13. The method of claim 12, further comprising a computer in the second vehicle including a vehicle computer processor and a vehicle computer memory including instructions executable by the vehicle computer processor to operate the vehicle based on the downloaded uncertainty map.

14. The method of claim 12, wherein the object includes one or more of a third vehicle and a pedestrian.

15. The method of claim 12, wherein the vehicle sensor data includes one or more of vehicle video sensor data, vehicle lidar sensor data, vehicle radar sensor data, and vehicle ultrasound sensor data.

16. The method of claim 12, wherein the first and second vehicle types include one or more of a vehicle make and a vehicle model.

17. The method of claim 12, further comprising determining the uncertainties by combining uncertainties for one or more objects with a same location and reported by a plurality of vehicles of the same vehicle type.

18. The method of claim 12, further comprising determining the database by combining the uncertainty with environmental conditions including one or more of time of day, season, and weather conditions.

19. The method of claim 12, wherein the object attributes include object speed and object direction.

20. The method of claim 12, further comprising determining the object data by processing vehicle sensor data with a deep neural network to determine the object identity, the object attributes, and the uncertainty.

* * * * *